April 19, 1927.                         1,625,558
J. McILWAINE
CUSHION TIRE
Filed July 25, 1926
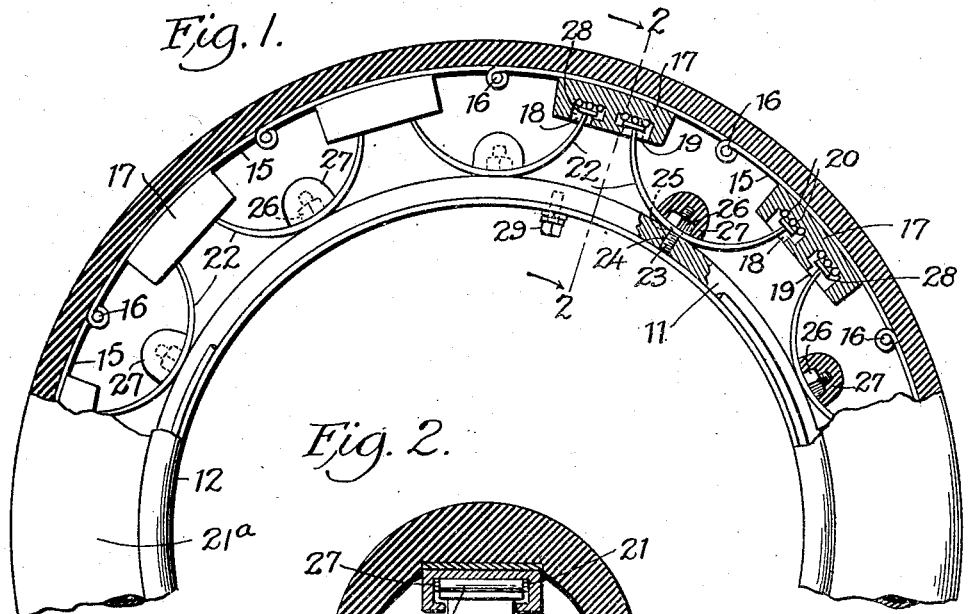
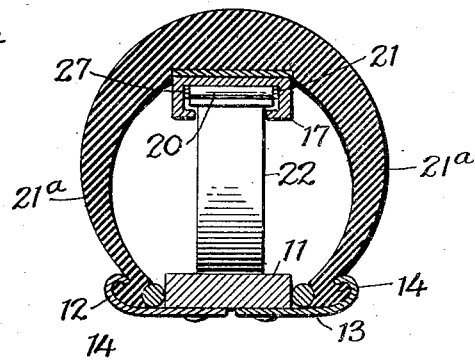
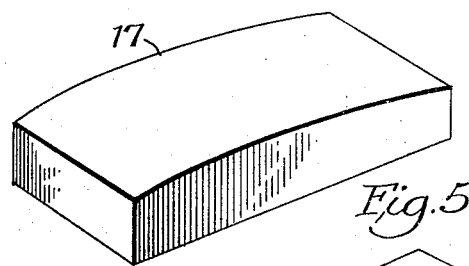
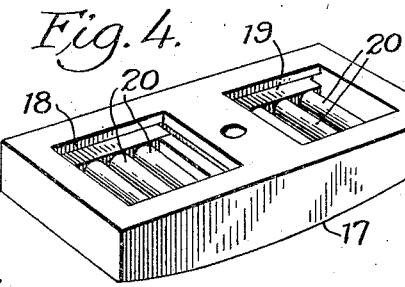
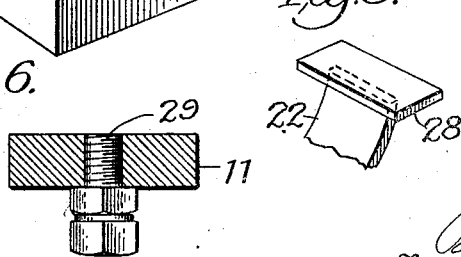
Inventor
John Mc Ilwaine
By Charles Ankleman
Attorney Patented Apr. 19, 1927.

1,625,558

UNITED STATES PATENT OFFICE.

JOHN McILWAINE, OF VIRDEN, ILLINOIS.

CUSHION TIRE.

Application filed June 25, 1926. Serial No. 118,532.

This invention relates to cushion wheels for automobiles and the like, and the invention has for an object the provision of wheels having springs by which tires are yieldably held with relation to rims or fellies of wheels; and the invention furthermore contemplates the provision of novel anti-friction elements as part of the bearings between the springs and the tire, which elements minimize wear of the parts and insure smooth and even action as the springs are compressed and then regain their normal shapes.

It is a further object of this invention to produce a cushion tire having novel means for anchoring the springs thereof to the rim of a wheel, the said invention also having novel means for securing a tire to the rim.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation partly in section of a fragment of a wheel embodying the invention;

Figure 2 illustrates a sectional view of the wheel on the line 2—2 of Fig. 1;

Figure 3 illustrates a perspective view of one of the spring bearing blocks;

Figure 4 illustrates a perspective view showing the opposite side thereof;

Figure 5 illustrates a perspective view of a portion of one of the springs; and

Figure 6 illustrates a sectional view of the rim with a plug applied thereto.

In carrying the invention into practice, a rim 10 is employed, consisting of a cylindrical ring 11 having plates 12 and 13, by which the beads 14 of the tire case are connected to the rim.

The tread support comprises a plurality of plates 15 hinged together as at 16 in order that each plate may be independently movable under the load or on contacting objects in the road.

Each plate is provided with a bearing block 17 that may be secured to it in any appropriate way, and each of said bearing blocks has cavities 18 and 19 provided with anti-friction elements 20 that have trunnions such as 21 rotatable in the side walls of the cavities.

A plurality of bow springs 22 are anchored at approximately midway their lengths to the ring 11, through the use of bolts 23 that are threaded in apertures 24 of the rim. The bolts extend through apertures 25 in the springs and nuts 26 are threaded on the bolts. The nuts are preferably provided with rubber heads 27 that may be manipulated for applying the nuts to the bolts when the parts are assembled.

Each spring has an angularly disposed foot or bearing plate 28 at each end and the bearing plate on one end engages the anti-friction elements of a block on one plate 15, whereas the other angularly disposed end of the spring engages the anti-friction elements in the block of the succeeding plate, it being shown that the springs are anchored inside of the pivots or joints between the springs. By this arrangement, one end of the spring will yield under pressure applied to one of the plates, which pressed plate may swing on its pivots without, to any great extent, affecting the succeeding plate, unless for some reason pressure is also exerted on the said succeeding plate. Under such circumstances, both ends of the spring would yield, but not necessarily to the same extent, as all would depend upon the impact or pressure.

Fellies now in common use have apertures for valve stems and it is the purpose of the inventor that when such fellies are used that the openings shall be closed by threaded plugs 29 in order that dust and water may be excluded.

It is the purpose of the inventor that the case or boot shall be made of rubber and the walls 21$^a$ shall be relatively flexible in order that the material may bend freely without occasioning undue wear.

It has been found in practice that a spring wheel of the character indicated will prove durable and efficient, and that even though the springs should become impaired, it will not unduly affect the operation of the wheel in its entirety and operations may be continued without emergency repair, although, of course, it is desirable to restore the parts to proper operating conditions as expeditiously as possible.

I claim:

1. In a cushion wheel, a rim, plates thereon having curved outer edges, a tire casing having beads engaged by the edges of the plates for anchoring it to the rim, a plurality of tread plates hingedly connected and embraced by the casing, yieldable means for holding the tread plates in spaced relation to the rim, said means comprising curved springs anchored to the rim between their ends, the said springs having angularly disposed ends forming bearing surfaces, and anti-friction elements held on the plates in operative relation to the ends of the springs.

2. In a cushion wheel, a rim, plates thereon having curved outer edges, a tire casing having beads engaged by the edges of the plates for anchoring it to the rim, a plurality of tread plates hingedly connected and embraced by the casing, yieldable means for holding the tread plates in spaced relation to the rim, said means comprising springs anchored between their ends to the rim, the said springs having angularly disposed ends, blocks secured to the plates between the pivots, said blocks having cavities therein, and anti-friction elements rotatable in the cavities engaged by the angularly disposed ends of the springs.

3. In a cushion wheel, a rim, a tire casing, means for securing the tire casing to the rim, a plurality of tread plates hingedly connected together and embraced by the casing, bow springs anchored between their ends to the rim, the said springs having angularly disposed ends forming bearing plates, and anti-friction elements mounted on the tread plates and engaged by the angular ends of the springs.

JOHN McILWAINE.